(12) United States Patent
Steinkraus, Jr. et al.

(10) Patent No.: US 7,994,460 B2
(45) Date of Patent: Aug. 9, 2011

(54) METHOD AND SYSTEM FOR CONTROLLING THE POSITION OF A BEAM OF LIGHT

(75) Inventors: Robert F. Steinkraus, Jr., San Francisco, CA (US); Gary W. Johnson, Livermore, CA (US); Anthony J. Ruggiero, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 389 days.

(21) Appl. No.: 12/165,425

(22) Filed: Jun. 30, 2008

(65) Prior Publication Data

US 2009/0323163 A1 Dec. 31, 2009

(51) Int. Cl.
*G01C 21/02* (2006.01)
(52) U.S. Cl. .................................................. 250/206.1
(58) Field of Classification Search ............... 250/201.1, 250/214 AG, 214 L, 206.1, 206.2
See application file for complete search history.

(56) References Cited

U.S. PATENT DOCUMENTS

| | | | | |
|---|---|---|---|---|
| 4,556,964 A * | 12/1985 | Trethewey | .................. | 369/44.14 |
| 5,004,901 A * | 4/1991 | Yoshimoto et al. | ........ | 250/201.5 |
| 5,068,540 A * | 11/1991 | Tsuji | ........................ | 250/559.38 |
| 5,552,883 A * | 9/1996 | Busch-Vishniac et al. | ........................ | 356/139.03 |
| 5,790,291 A | 8/1998 | Britz | | |
| 6,901,220 B1 | 5/2005 | Carlson | | |
| 7,072,591 B1 | 7/2006 | Smith | | |
| 2003/0067657 A1 | 4/2003 | Dimmler | | |
| 2005/0069325 A1 | 3/2005 | Cicchiello | | |
| 2007/0030067 A1* | 2/2007 | Brueske | ........................ | 330/254 |

FOREIGN PATENT DOCUMENTS

| | | |
|---|---|---|
| EP | 1158704 | 4/2003 |
| EP | 1166469 | 8/2005 |

* cited by examiner

*Primary Examiner* — Thanh X Luu
(74) *Attorney, Agent, or Firm* — John P. Wooldridge

(57) ABSTRACT

An method and system for laser beam tracking and pointing is based on a conventional position sensing detector (PSD) or quadrant cell but with the use of amplitude-modulated light. A combination of logarithmic automatic gain control, filtering, and synchronous detection offers high angular precision with exceptional dynamic range and sensitivity, while maintaining wide bandwidth. Use of modulated light enables the tracking of multiple beams simultaneously through the use of different modulation frequencies. It also makes the system resistant to interfering light sources such as ambient light. Beam pointing is accomplished by feeding back errors in the measured beam position to a beam steering element, such as a steering mirror. Closed-loop tracking performance is superior to existing methods, especially under conditions of atmospheric scintillation.

60 Claims, 6 Drawing Sheets

METHOD AND SYSTEM FOR CONTROLLING THE POSITION OF A BEAM OF LIGHT

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to free-space optical communication systems, and more specifically, it relates to improvements in the dynamic range of laser beam tracking in free-space optical communication systems.

2. Description of Related Art

Free-space optical communications systems are dependent upon the accuracy and stability of the pointing of a collimated laser beam. High stability must be maintained in spite of mounting platform vibrations, thermal drift, and especially atmospheric turbulence and scintillation which causes large and rapid fluctuations in beam position and intensity. A beam position sensing and feedback control system for stabilization is required and has been implemented in prior art by several means including position sensing detectors, quadrant cells, cameras of various types, and elaborate adaptive optics systems. One shortfall in the prior art is a lack of dynamic range, resulting in unacceptable compromises in pointing precision and/or control bandwidth.

Ubiquitous commercial solutions (e.g., Ontrak Photonics, Inc.; Hamamatsu Corp.; Melles Griot) use DC-based approaches to signal detection and processing. This provides no rejection of ambient light or other interfering sources and is subject to DC drift and 1/f noise.

Many approaches have used analog divider chips (e.g., Ontrak Photonics, Inc.) that are subject to offset errors, resulting in large errors at low signal levels. Dynamic range is rarely more than 20 to 25 dB optical.

The method reported by Narayanan, et. al. [Ref. 4] can be augmented with the AGC chain of the present invention to dramatically enhance dynamic range.

An improvement in dynamic range that provides pointing precision and/or control bandwidth is desirable. The present invention provides such an improvement.

SUMMARY OF THE INVENTION

It is an object of the present invention to provide improvements in the dynamic range of free-space optical communication systems.

Another object is to provide free-space optical communication systems with automatic gain control combined with optimized filtering and synchronous demodulation in the detection subsystem such that resulting measurements are accurate despite the signal dynamics and can then be fed back to a beam steering device, such as a fast steering mirror.

These and other objects will be apparent based on the disclosure herein.

An improved method and system for laser beam tracking and pointing is described. It is based on a conventional position sensing detector (PSD) or quadrant cell but with the use of amplitude-modulated light. A unique combination of logarithmic automatic gain control, filtering, and synchronous detection offers high angular precision with exceptional dynamic range and sensitivity, while maintaining wide bandwidth. Use of modulated light enables the tracking of multiple beams simultaneously through the use of different modulation frequencies. It also makes the system resistant to interfering light sources such as ambient light. Beam pointing is accomplished by feeding back errors in the measured beam position to a beam steering element, such as a steering mirror. Closed-loop tracking performance is superior to existing methods, especially under conditions of atmospheric scintillation.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

An improved method and system for laser beam tracking and pointing is described. It is based on a conventional lateral-effect position sensing detector (PSD) [Ref. 5, 6] or quadrant cell but with the use of amplitude-modulated light. Measured beam position on the face of the PSD is related to the beam's angle of incidence as defined by the properties of a series of lenses that collect the arriving beam and deliver it to the PSD. After detection and demodulation, the measured angle of arrival may be compared to a desired value (the setpoint). If an error exists, a correction command may then be sent to a steering mirror or other movable element to affect re-pointing of the receiving optical package. This closed-loop steering behavior is highly desirable for precise laser beam detection and delivery in many applications.

Position Detection

Figure 1:
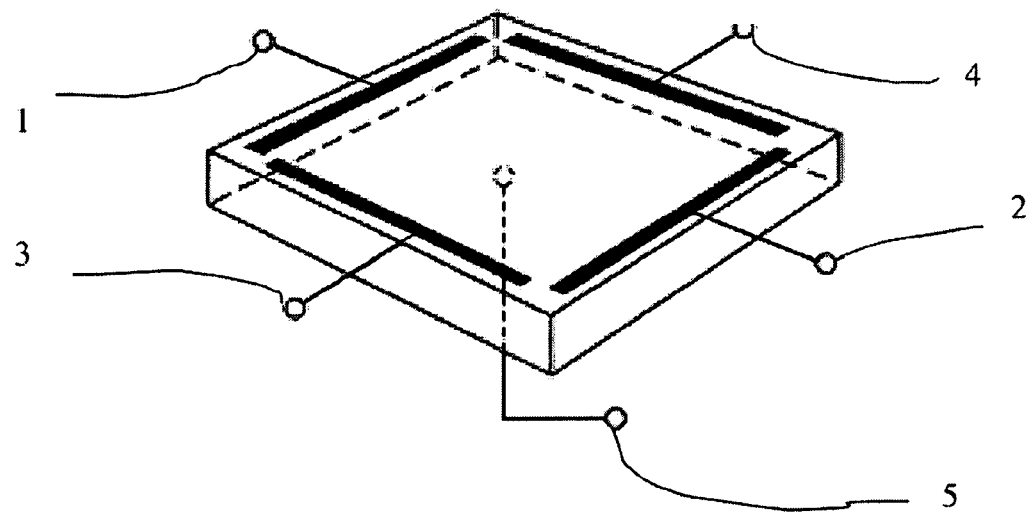
FIG. 1 shows a prior art tetralateral PSD.
Figure 2:
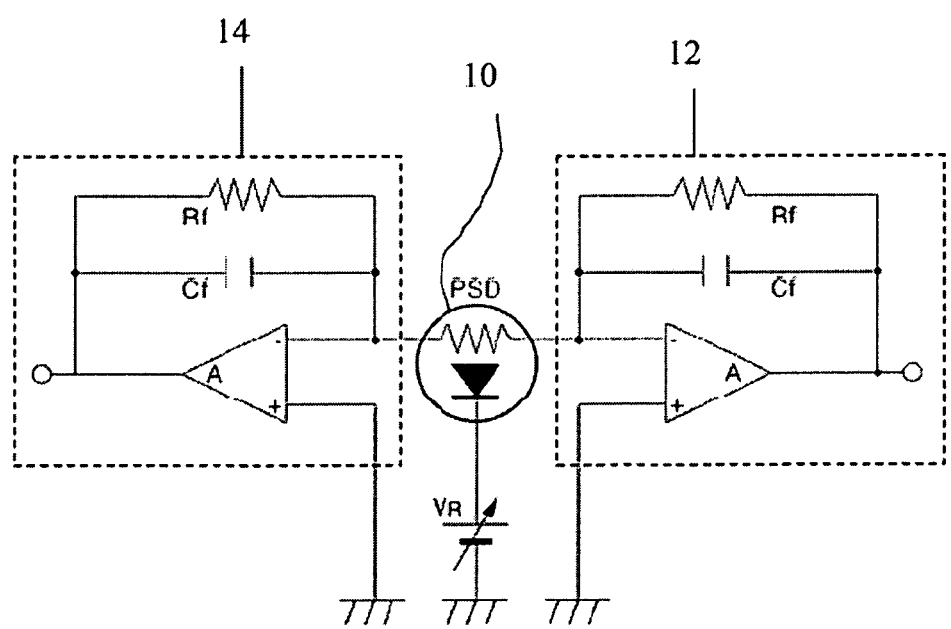
FIG. 2 shows prior art transimpedance amplifiers connected to one axis of a PSD.
Figure 3:
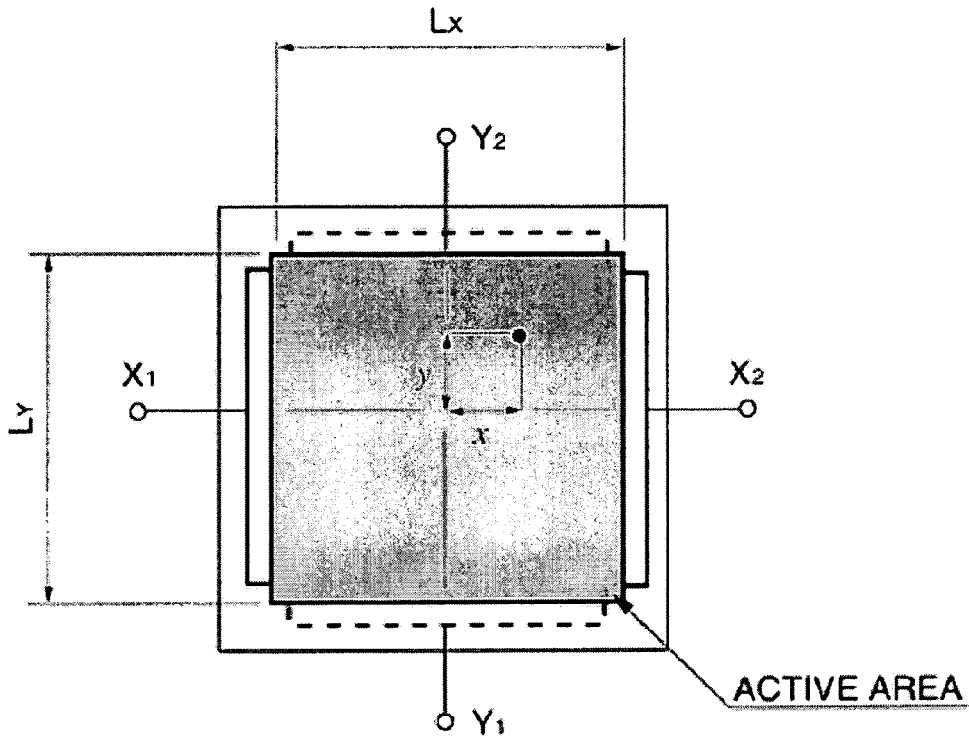
FIG. 3 illustrates active area for a tetralateral PSD.

Detection of the PSD signals proceeds as follows [See Refs. 1-3 for tutorials]. A tetralateral (two-axis) PSD produces four currents that vary ratiometrically, dependent upon the position of the centroid of the beam striking the PSD. (Note that a single-axis, or bilateral, PSD may also be used to measure linear beam position rather than X-Y position.) FIG. 1 shows a prior art tetralateral PSD. This PSD includes anodes 1-4 and cathode 5. The four currents are then amplified by transimpedance amplifiers, producing voltages proportional to the current in each of the four electrodes. FIG. 2 shows prior art transimpedance amplifiers 12 and 14 connected to one axis of a PSD 10. FIG. 3 is a top view of the tetralateral PSD of FIG. 1. The ratio of these currents (or voltages) is translated into absolute beam position upon the PSD for the X axis in FIG. 3 according to the formula:

$$\frac{I_{X2} - I_{X1}}{I_{X1} + I_{X2}} = \frac{2x}{L_X},$$

and for the Y axis in FIG. 3 according to the formula:

$$\frac{I_{Y2} - I_{Y1}}{I_{Y1} + I_{Y2}} = \frac{2y}{L_Y}.$$

Figure 4:
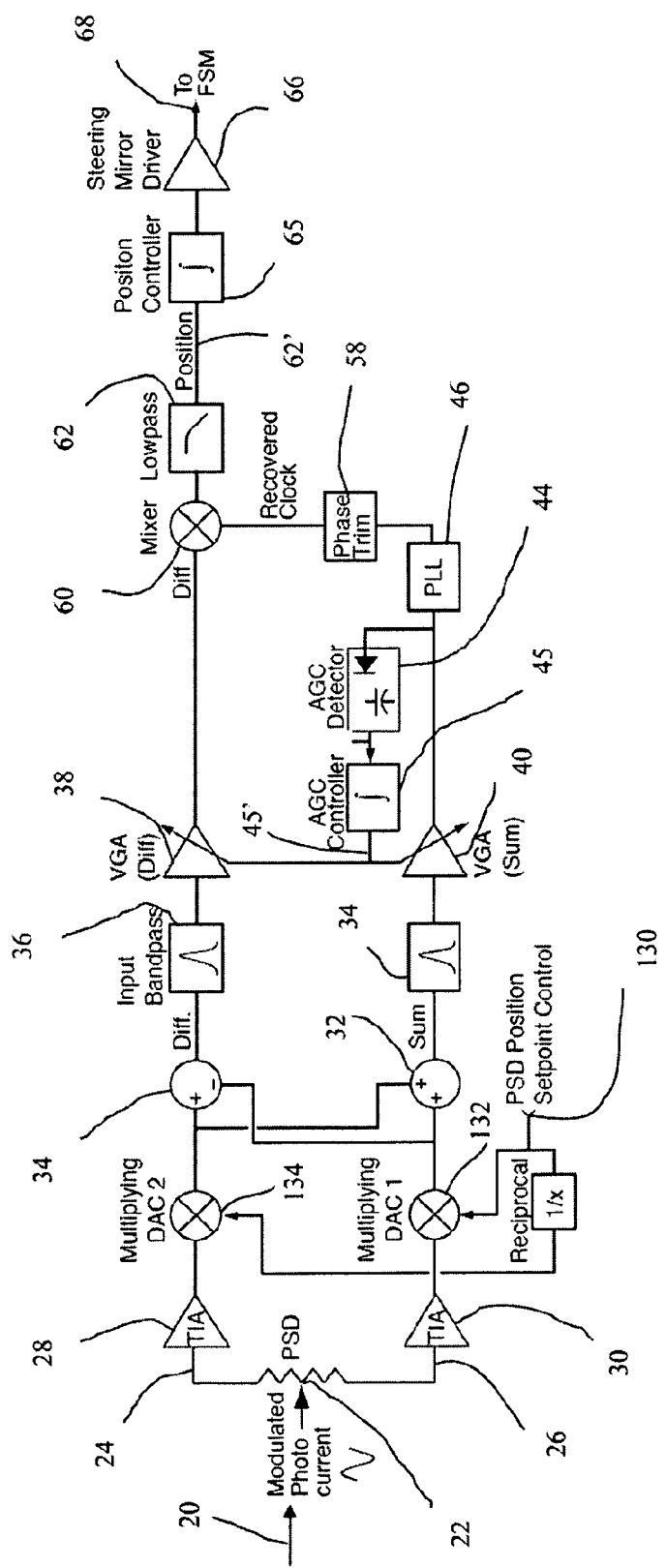
FIG. 4 shows a functional diagram of an embodiment of the present synchronous position detector system.

Referring to FIG. 4, a beam 20 of amplitude modulated (AM) light is directed onto a PSD 22. The PSD generates two currents originating at the area that the beam strikes the PSD. One current flows in arm 24, and the other flows in arm 26. These two currents flow in opposite directions and vary ratiometrically, i.e., when one goes up, the other goes down. Each current rises and falls based upon the rise and fall of the AM light. The phase of the currents is the same at both output ends of PSD 22, following instantaneous light intensity. Each current from the PSD 22 is converted to a voltage by a transimpedance amplifier (TIA). TIAs are well known in the art. Thus, the current in arm 24 is converted to a voltage by TIA 28 and the current in arm 26 is converted to a voltage by TIA 30. Since beam 20 is amplitude modulated, the transimpedance amplifiers produce an AC signal at the frequency of modulation (the carrier frequency). The use of AC signals is highly desirable in nearly all signal processing systems. It avoids many sources of DC drift and 1/f noise, and simplifies narrow-bandwidth signal recovery.

PSDs are commercially available with sensitivity to a variety of wavelengths of light from near UV through near IR. The present discussion provides and exemplary embodiment that is operable at near IR wavelengths and uses detectors made of InGaAs [Ref. 7] or Ge. The present invention is not limited to the near IR, however, and use of the invention at other wavelengths will be apparent to those skilled in the art based on this disclosure. For the IR wavelengths, detectors se detectors made of InGaAs or Ge impose certain requirements on the signal conditioning circuitry because of low interelectrode resistance, typically less than 1 kilo-ohm. In particular, the amplifiers must be designed to achieve a low noise figure with the low source impedance.

A related method of position detection, based on phase shift across the detector [Ref. 4], can also be used with InGaAs or Ge, with some adjustments. In the prior art, a much higher inter-electrode resistance was assumed, one that is not currently achievable in near IR detectors—only in silicon-based visible detectors. However, the method is usable with InGaAs or Ge provided that the modulation frequency is near the natural −3 dB frequency of the detector defined by 1/(2*Pi*Cshunt*Rinter-electrode).

The system and method are also entirely applicable to quadrant cells as a replacement for the PSD. Quadrant cells use an array of four photodiodes which produce four currents that vary in a manner similar to that of a PSD. The primary differences are that quad cells do not compute a true centroid, and they fail to give full two-axis position information unless part of the incident light strikes all four photodiodes. The remainder of this document will refer only to PSDs, but quad cells remain applicable as another embodiment.

For each of the two axes of the PSD, all of the following processes are performed independently. The present approach uses primarily analog circuits but can also be implemented by digitizing the four amplified PSD signals and then using equivalent digital signal processing algorithms. Note that if a beam offset on the PSD is desired, then the circuit uses a multiplying DAC (or potentiometer, or more generally a variable attenuator) in each leg, as discussed below.

Compute Sum and Difference

Figure 5:
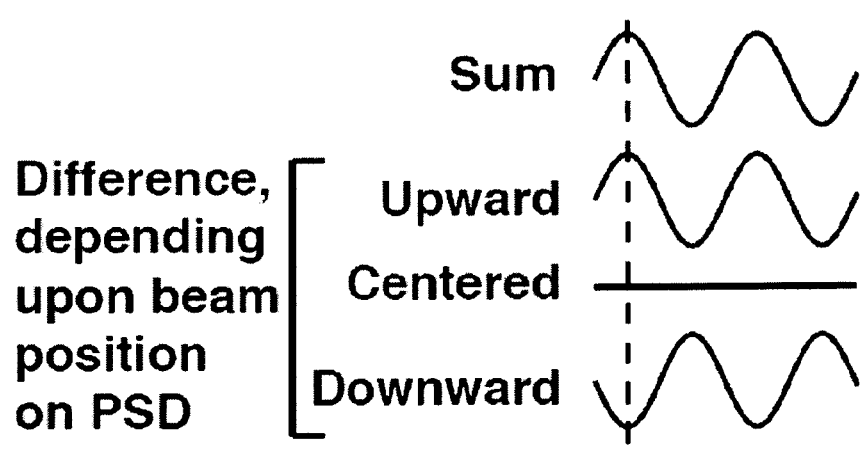
FIG. 5 illustrates the phase relationship between the sum and difference signals of the present invention.

Next, the voltage signal from TIA 30 is summed at node 32 and differenced at node 34. The sum signal and the difference signal are AC waveforms at the carrier frequency but also contain residual amplitude noise due to, e.g., atmospheric beam scintillation, beam pointing jitter, and any interfering light sources. FIG. 5 illustrates the phase relationship between the sum and difference signals of the present invention. The sum signal 50 does not change when the beam position on the PSD changes. Its value will vary only as the beam intensity on the PSD varies. The phase and magnitude of the difference signal, however, are dependent upon the position of the centroid of the input beam on the PSD, as well as beam intensity. When the centroid of the beam is centered on the PSD, the difference signal is zero. When the centroid of the beam is more near arm 24, the difference signal will be in phase with the sum signal. When the centroid of the beam is more near arm 26, the difference signal will be 180 degrees out of phase with the sum signal. The magnitude of the difference signal increases as the input beam approaches arm 24 and arm 26.

Because the phase and magnitude of the difference signal are dependent upon the position of the centroid of the input beam on the PSD, it is desirable to use the-difference signal to control a fast steering mirror, but as discussed above, the difference signal contains residual amplitude noise. Various methods of recovering the clock (modulation frequency) from the sum signal and using that clock in a synchronous detector to demodulate the difference beam, i.e., to remove the amplitude noise, are provided below.

Variable Gain Amplifiers

Figure 6:
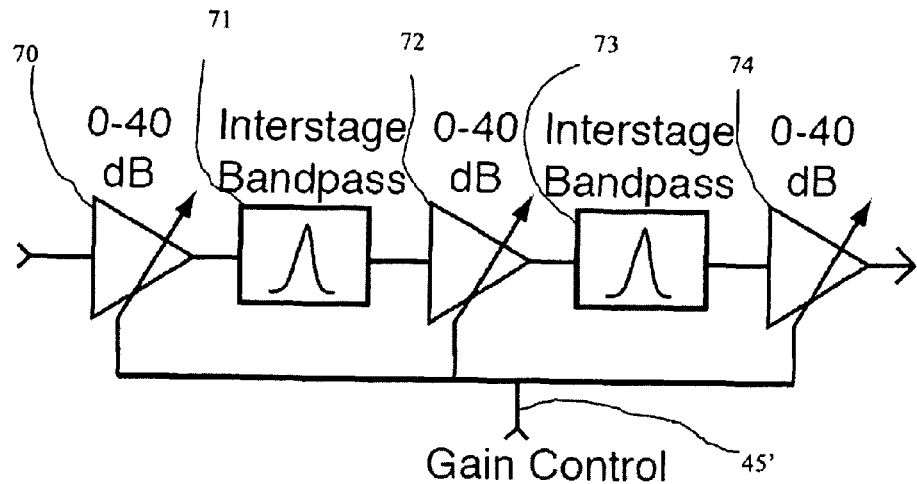
FIG. 6 shows the details of an exemplary VGA of the present invention.

The sum and difference signals are filtered by bandpass filters 34 and 36, respectively, and each are passed to a series of logarithmic variable gain amplifiers (VGAs), such as an Analog Devices AD600. The filtered difference signal is passed to VGA chain 38 and the filtered sum signal is passed to VGA chain 40. FIG. 6 shows the details of an exemplary VGA chain of the present invention. In each chain, three VGAs (70, 72, 74) are typically used, each with an effective dynamic range of about 40 dB. Between stages, additional bandpass filters (71, 73) at the carrier frequency are inserted. The output 45' of AGC controller 45, discussed below, is fed into VGAs 70, 72 and 74. This is standard practice in intermediate-frequency (IF) processing in superheterodyne radios and results in enhanced dynamic range and rejection of out-of-band signals.

Received Signal Strength

Amplitude of the output of the final VGA for the sum signal is measured by an AGC detector 44. This may be accomplished with a precision rectifier and lowpass filter, an rms detector, or by homodyne demodulation at the carrier frequency. The result is input into an automatic gain control controller 45, which produces an output 45' that is a DC voltage that varies with the amplitude of the carrier. It is referred to as the received signal strength indicator (RSSI), as indicated at 45' and is also useful as a diagnostic for the received beam intensity. It is important to note that this signal is not dependent upon the position of the beam on the PSD. And, since it is derived from the signal at the carrier frequency, it is independent of DC background light and any modulated light not at (or near) the carrier frequency. In the case of a tetralateral (two-axis) PSD, the total RSSI signal is the sum of the RSSI signals derived from the two individual RSSI measurements.

Alternate Received Signal Strength Indicator

Because the PSD has a common cathode terminal (as opposed to the four independent anode terminals), it is possible to measure this common current, which is proportional to the total power of the light striking the PSD. This is an alternative way of creating a received signal strength indicator, with the property that this signal does report power at all frequencies, including DC. It is especially useful for detecting PSD overload. In one embodiment, the common cathode terminal is connected to a transimpedance amplifier which converts current to voltage. The resulting voltage feeds a logarithmic-responding analog circuit, or it can be digitized. This provides an RSSI indicator with wide dynamic range.

Regulation of Sum Signal

The RSSI signal is fed back to all of the VGAs for both the sum and difference chains. A controller 45, typically an integrator, is required to regulate this feedback loop, and produces an output signal 45'. The first result of this feedback is that the sum signal amplitude is almost perfectly stabilized, regardless of the input amplitude, over the entire dynamic range of the VGA's capability. In the present embodiment, nearly 1.20 dB (1,000,000:1) of electrical dynamic range is accommodated. This constitutes an automatic gain control (AGC) loop. The use of logarithmic VGAs allows the temporal response of the AGC loop to be independent of the absolute input signal amplitude, and also nearly symmetrical for increasing or decreasing amplitudes. In contrast, if a linear-response VGA were employed, response times would be much slower for small signals. This high AGC bandwidth is desirable to eliminate nearly all expected variations in the signal.

The final output of the sum signal processing chain is then a relatively clean, well-filtered, amplitude-stabilized sine wave at the carrier frequency.

Regulation of the Difference Signal

The same RSSI-based AGC feedback that regulated the sum signal also serves to adjust the amplitude of the difference signal delivered from its VGA chain. First assume that the incident light intensity is constant. When the beam moves across the PSD, the difference signal's magnitude will vary proportionally with position. At the center of the PSD, the difference is zero because both currents are equal. Magnitude then increases with a positive phase shift as the beam moves off center in one direction, and with a negative phase shift in the other. A synchronous detector (described below) can unambiguously measure these changes in amplitude and phase. Phase of the difference signal is observed with respect to phase of the sum signal. The sum is always in phase with intensity of the modulated light. When the difference between the two ends of the PSD is computed, one end is in-phase with the light intensity while the other is anti-phase. Thus, the difference signal varies from maximum amplitude and in-phase at one end, through zero at the center, to maximum amplitude and of opposite phase at the other end.

Regarding variations in light intensity, at the center of the PSD, the difference is always zero and the variations cancel out. But as the beam moves off center, the difference is the product of beam position times beam intensity. In other words, a change in position is indistinguishable from a change in intensity.

The solution is to use the RSSI signal, which is solely related to intensity, to cancel out intensity-induced variations in the difference signal. To do so, we simply apply the RSSI-based AGC feedback to the difference VGA chain in exactly the same was as it was done for the sum VGA chain. It's a kind of master-slave relationship between the two matched VGA chains. Then, the output of the final difference VGA is dependent only upon beam position. In other words, as the intensity decreases, the RSSI signal also decreases, and it tells all of the VGAs to increase their gain, thus exactly canceling the loss of intensity. Then the only possible variation in the recovered difference signal must be due to beam position.

Bandpass Filters

As discussed above, an input bandpass filter 34, 36 is applied to each of the sum and difference, respectively, tuned to the carrier frequency, for instance 48 kHz as used in the present embodiment. This reduces out-of-band noise including any residual DC from ambient light, or light with other modulation frequencies that may have impinged upon the PSD. Selection of bandwidth (Q) of these filters is critical to the overall performance of the system in terms of tradeoffs between closed-loop response time vs. noise rejection.

The input bandpass filters do add phase shift to the fast steering mirror (FSM) control loop. Therefore, an overly-narrow bandwidth will restrict the response time of a closed-loop position controller. Good performance is achieved when the input bandpass bandwidth is selected to be five to ten times the desired position sensing bandwidth. A slow speed system (one that is optimized for very low optical power) would use a narrower bandpass filter than a fast system. The PSD transimpedance amplifiers (and the PSDs themselves) have an intrinsic noise floor [Ref. 9]. This noise floor is amplified along with the desired PSD signal. The rms voltage of the noise floor is proportional to the square root of the bandwidth of the input bandpass filters to the AGC stages. The narrower the bandpass filters, the larger the S/N of the system.

Again, the input bandpass filter 34 is added before the variable gain amplifier chain 40 in the AGC loop. The AGC loop has wider-bandwidth intra-stage bandpass filters. The AGC loops will respond faster than the amplitude fluctuations present after the input bandpass filters. This allows the AGC loop to remove amplitude noise, not position information.

Demodulation of the Difference Signal

At the output of the difference signal's VGA chain is a sine wave at the modulation frequency that varies in amplitude and phase, dependent only upon the position of the beam upon the PSD.

A synchronous detector, or lock-in amplifier, is one way to demodulate this signal. Such detectors require a stable local oscillator (LO) at the carrier frequency. This is easily derived by using a phase-locked loop (PLL) 46 with its input being the regulated sum signal. The PLL output is highly stabilized in both amplitude and phase, which is required for accurate demodulation. A narrowband PLL should be used to reject out-of-band noise.

Figure 7:
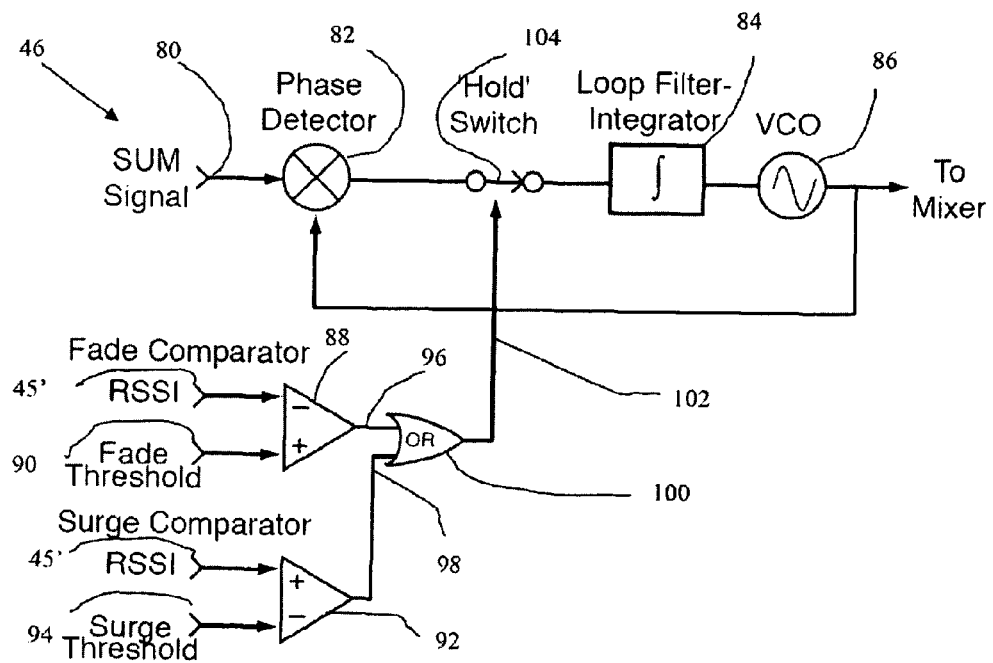
FIG. 7 shows a present phase locked loop with fade/surge management via a track-and-hold switch.

FIG. 7 shows an exemplary phase locked loop with fade and surge management via a track-and-hold switch usable with the present invention. The basic phase locked loop passes the regulated sum signal 80 (FIG. 4 and FIG. 7)) to a phase detector 82, the output of which is passed in turn to a loop filter-integrator 84 and voltage-controlled oscillator 86. An enhancement to standard PLL architectures is shown in FIG. 7. When the optical signal surges or fades to an extent that the PLL can no longer reliably discern the carrier, a loss-of-lock condition arises. Depending upon the PLL loop response, its oscillator (VCO) frequency may drift significantly, so that when the signal returns to normal, an objectionably-long relocking transient may occur. During that time, no demodulation can be performed. To improve PLL response, comparator 88 (using the integrated RSSI signal 45' as the inverting input and a fade threshold 90 as the non-inverting input) detects extreme fades. An additional comparator 92 is added to detect surges. Comparator 92 uses the integrated RSSI signal 45' as the non-inverting input and a surge threshold 94 as the inverting input. The fade comparator 88 output 96 and the surge comparator 92 output 98 are both fed into an OR gate 100, which produces an output 102. Within the PLL, the loop filter contains a track-and-hold switch 104. During a fade/surge, the loop filter goes into hold, keeping the VCO at a constant frequency. When signal returns, the loop goes back into lock very quickly. An adjustable phase shifter 58 is provided after PLL 46. This is a one-time calibration adjustment that accounts for all phase shifts in the system. It is adjusted so that when the beam is physically at the center of the PSD, the final position output signal is zero.

The signal from the phase trim 58 is used as the clock signal for a synchronous detector 60, shown in FIG. 4. The output of the VGA chain 38 is used as the input to the synchronous detector 60. There are many well-known ways to implement a synchronous detector including multipliers, switching circuits, balanced modulators, and digital signal processors, and all are applicable. The key to excellent performance is to provide a clean input signal and LO, embodiments of which have been discussed above. The output of a synchronous detector is proportional to the amplitude and phase of the input signal. Thus, as the beam moves off-center on the PSD, the demodulation process will report both the distance (amplitude) and direction (phase) of the motion.

The demodulated output is fed to a lowpass filter 62, shown in FIG. 4, to reject the modulation frequency and its harmonics. This filter generally determines the ultimate temporal response of the position measurement process.

Measurement Precision

Compromises can be made regarding position resolution, linearity, and total range. Prior art typically focuses on optimizing linearity and absolute accuracy at moderate to high optical power levels, as opposed to dynamic range or bandwidth. That is acceptable for laboratory measurements but not for free-space beam propagation over long distances. For the present invention, testing has proven that as optical power is reduced, the mean measured position does not vary, only the signal-to-noise ratio changes. This is a remarkable result and is a major advancement over prior art. This is because of the behavior of the AGC loop where, as previously described, it only rejects changes in amplitude while leaving the position information unchanged.

A practical observation: Researchers working with free-space optical communications often are unaware of the effect of dynamic range on their PSD-based measurements [Ref. 8]. Using ordinary methods described in prior art, dramatic errors in position measurement arise. Disagreement between beam propagation models and experiments went unexplained. The present inventors have found that every time an improvement in dynamic range capability was made, the apparent range of beam motion is smaller and in better agreement with models, indicating that previous measurements were pessimistic due to imperfect rejection of amplitude fluctuations.

It is also possible to adjust the gain after the demodulator 60. This changes the total range of the position measurement and allows one to zoom in and observe ever-smaller changes, down to the noise level of the system.

Controlling Beam Pointing

Once the beam position is reliably measured, it may be used to control the pointing of an optical system. This is standard practice and proceeds as follows. Measured position is compared with a desired position, or setpoint. The difference between setpoint and measurement is the error. Error is applied to a feedback controller 65, such as in integrator, which amplifies and/or accumulates the error and passes the signal to a driver 66, the output of which then drives an optical element 68, such as a steering mirror, that is directing the light that impinges upon the PSD. If the mirror is driven in the correct direction and with appropriate closed-loop gain and velocity, it will then maintain the beam at the setpoint location regardless of disturbances.

An important feature of the present invention with regards to beam pointing is dynamic range and bandwidth of the position measurement. Others have attempted to control the pointing of lasers propagating through the atmosphere using prior art in the measurement system. Poor performance is universally reported, due almost entirely to a lack of dynamic range, typically around 20 dB of optical power. In contrast, the present inventors have measured a demand of 40 dB under ordinary atmospheric conditions. The shortfall results in defective position measurements that cause the steering element to be driven erratically, with disastrous results. The present invention achieves vastly superior dynamic range—in excess of 50 dB—with bandwidths well into the kHz range, and solves many difficult problems.

Fade/Surge Management

Figure 8:
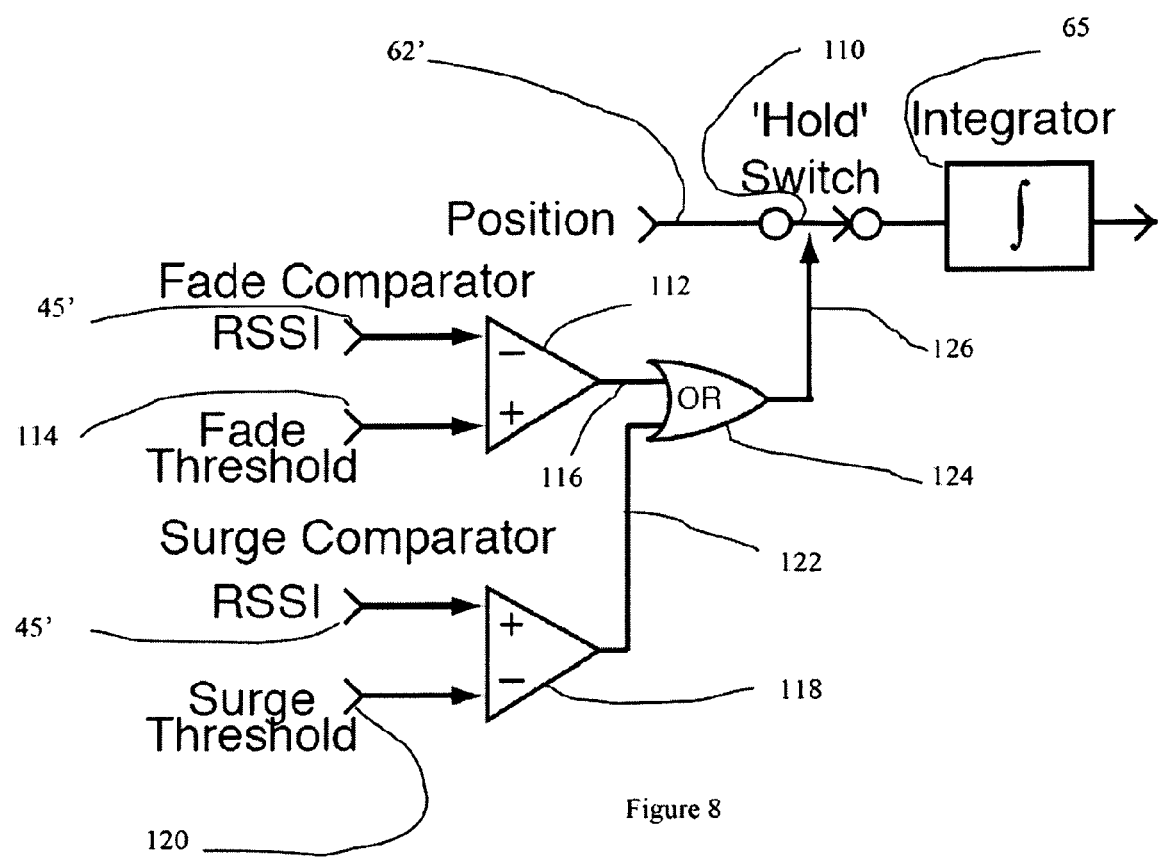
FIG. 8 shows the details of an exemplary position controller with fade/surge management for use with the present invention.

An enhancement to the feedback controller improves overall pointing performance when the system's dynamic range is exceeded or the incident beam is temporarily blocked. FIG. 8 shows the details of an exemplary position controller with fade/surge management for use with the present invention. The output 62' of lowpass filter 62 is first directed though a 'hold' switch 110, which is activated when extreme fades or surges occur. The integrated RSSI signal 45' has a useful dynamic range defined by the electrical limits of the VGA chains. A fade comparator 112 inputs a fade threshold 114 as a non-inverting input and the integrated RSSI signal 45' as the inverting input that extreme fades in incident power are instantaneously detected. Fade comparator 112 produces an output signal 116. Surge comparator 118 uses the integrated RSSI signal 45' as the non-inverting input and uses a surge threshold 120 as the inverting input to produce an output signal 122 that, along with output signal 116 from fade comparator 112, is fed into an OR gate 124. The output 126 from or gate 124 is fed into hold switch 110. During fades and surges, the feedback controller 65 is temporarily frozen. That is, instead of moving the steering element falsely in response to an invalid position measurement, the steering element stops at its last known good position. This can be implemented by, for instance, disabling the controller's integrator.

Offsetting the Beam Reference Position on the PSD

Optimal performance of the AGC chains and synchronous demodulator is obtained only when the difference signal is at a null. That is, when the currents on opposite PSD cathodes are of approximately equal magnitude. Under that condition, the widest dynamic range and lowest measurement noise performance are obtained. However, for situations where it is desirable to operate with the beam offset from the intrinsic center of the PSD (i.e., a different setpoint), an additional method is provided. Prior to computing the sum and difference signals, one leg of the PSD is multiplied by an offset factor greater than one, while the opposite leg is multiplied by the reciprocal of the offset factor used on the first leg. The difference will then be zero only when the beam centroid is physically displaced by the offset factor. Simultaneously, the sum signal remains unchanged. This is illustrated in FIG. 4 with a PSD position setpoint control signal 130 provided as input to multiplying DAC 132 and the reciprocal of signal 130 provided as input to multiplying DAC 134. Thus, a closed-loop tracking system will now drive the beam to the new offset setpoint. A multiplying DAC is only one way of attenuating the signals. Alternatively, digital potentiometers or any other suitable type of variable attenuator may be used.

Tracking of Multiple Beams

A plurality of laser beams can be tracked simultaneously with the present invention through the use of frequency division multiplexing. A single PSD can feed multiple signal processing chains as already described. The difference between each chain is the choice of bandpass filter frequency, for each chain, chosen to match the modulation frequency of each incident beam. Measurement performance will then be equivalent and independent for each beam.

Figure 9:
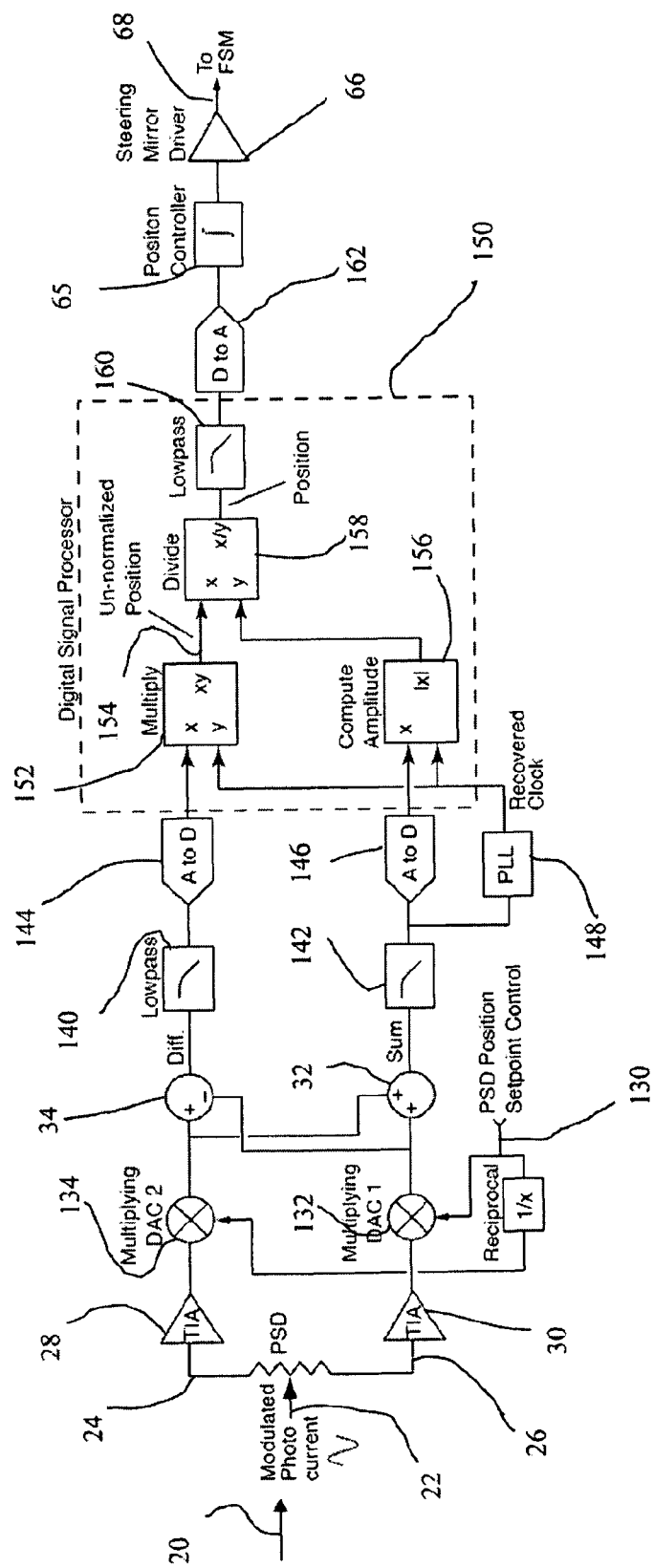
FIG. 9 shows an embodiment that uses digital signal processing (DSP) to recover the position measurement from the difference signal.

FIG. 9 shows an embodiment that uses digital signal processing (DSP) to recover the position measurement from the difference signal. In an exemplary method, a PLL with wide dynamic range is still required to recover the clock signal from the Sum. This may be implemented by analog, digital, or mixed-signal techniques.

Elements of FIG. 9 that are similar or identical to those of FIG. 4 are numbered identically. The difference signal is filtered by lowpass filter 140 and the sum signal is filtered by lowpass filter 142. The DSP subsystem consists of A/D converter 144, configured to receive the filtered difference signal from lowpass filter 140. The DSP subsystem consists of another A/D converter 146, configured to receive the filtered sum signal from lowpass filter 142. A/D converters 144 and 146 sample at more than twice the modulation frequency in order to satisfy the Nyquist criterion. These A/D converters require extremely high dynamic range. The recovered clock from PLL 148 uses the filtered sum signal as an input. A digital signal processor 150 includes a nodule 152 that multiplies its x and y inputs to produce an un-normalized position output 154. To accomplish this, the output of PLL 148 is fed into the y input of digital module 152 and the output of A to D converter 144 is fed into the x input of module 152. The un-normalized position output 154 contains a convolution of the actual beam position and beam intensity noise. So far, this is a simple one-phase lock-in amplifier. Then the average amplitude of the Sum signal is computed in module 156. There are many standard DSP techniques for doing this. This signal represents only the beam intensity information. The un-normalized position output 154 is then divided in module 158 by the amplitude computed by module 156. This removes the beam intensity noise. An optional step applies more lowpass filtering (160) to remove high-frequency noise. This is the final Position signal, which can be converted to an analog signal with, e.g., D to A converter 162.

The present invention is easily fabricated using existing commercial electronic components in a very compact form factor and using very low power, on the order of 2 Watts, for a complete measurement system.

REFERENCES

Incorporated Herein by Reference

1. Hamamatsu Corp., "PSD (Position Sensitive Detector)" product guide and tutorial. This reference document on PSDs is available from http://sales.hamamatsu.com/en/products/solid-state-division/position-sensitive-detectors/catalog.php.
2. Melles-Griot Corp., tutorial on position measurement: http://beammeasurement mellesgriot.com/tut_pos_sensing_det.asp
3. OSI Optoelectronics, Inc., tutorial on position measurement: http://www.osioptoelectronics.com/products/08-10_PSDChar_OSIOpto.pdf
4. Narayanan, C., Buckman, A. B., and Busch-Vishnic, I., "Position Detection of Multiple Light Beams Using Phase Detection." IEEE Trans. on Instrumentation and Measurement 43:6, December, 1994. Describes a method using modulated carriers and phase discrimination to obtain position for multiple beams.
5. Wallmark, J. T., "A new semiconductor photocell using lateral photoeffect." Proc. of IRE, Vol. 45, p. 44-483, 1957.
6. Woltring, H. J., "Single- and dual-axis lateral photodetectors of rectangular shape." IEEE Trans. Electron Devices, Vol. 22, p. 581-590, 1975.
7. Maigne, P., et. al., "An InGaAs—InP Position-Sensing Photodetector." IEEE J. of Quantum Electronics 25:5, p. 820-823, May, 1990.
8. Moore, C. I., et. al, "Free-space high-speed laser communication link across the Chesapeake Bay." Free-Space Laser Communication and Laser Imaging II., Proc. SPIE Vol 4821, 2002.
9. Narayanan, C., Buckman, A. B., and Busch-Vishnic, I., "Noise Analysis for Position Sensitive Detectors." IEEE Trans. on Instrumentation and Measurement 46:5, Oct., 1997.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method for controlling the position of a beam of light, comprising:

directing a beam of amplitude modulated (AM) light onto a position sensitive detector (PSD), wherein said AM light is modulated at a modulation frequency, wherein said PSD will produce a first current ($I_1$) and a second current ($I_2$), wherein said $I_1$ and said $I_2$ vary ratiometrically depending on where said beam is located on said PSD;

converting said $I_1$ to a first voltage ($V_1$) and converting said $I_2$ to a second voltage ($V_2$);

subtracting said $V_2$ from said $V_1$ to produce a difference signal;

digitally normalizing said difference signal to produce a normalized signal;

controlling, using said normalized signal, said position of said beam of light on said PSD;

adding said $V_1$ to said $V_2$ to produce a sum signal;

filtering said difference signal with a first bandpass filter to produce a filtered difference signal;

filtering said sum signal with a second bandpass filter to produce a filtered sum signal;

amplifying said filtered difference signal with a first variable gain amplifier system to produce a first amplified difference signal;

amplifying said filtered sum signal with a second variable gain amplifier system to produce a first amplified sum signal;

detecting said first amplified sum signal with an automatic gain control (AGC) detector to produce a detected sum signal;

inputting said detected sum signal to an automatic gain control controller to produce a received signal strength indicator (RSSI); and feeding said RSSI back to said first variable gain amplifier system to produce an amplified difference output signal that is modulated at said modulation frequency.

2. The method of claim 1, further comprising feeding said RSSI back to said second amplifier system to produce an amplified sum output signal.

3. The method of claim 2, further comprising producing a clock signal from said amplified sum output signal, wherein said clock signal has a frequency that corresponds to said modulation frequency.

4. The method of claim 3, wherein the step of producing a clock signal from said amplified sum output signal comprises:

detecting, with a phase detector, a phase of said amplified sum output signal;

integrating, with a loop filter integrator, an output from said phase detector; and amplifying, with a local oscillator, an output from said loop filter-integrator.

5. The method of claim 4, further comprising comparing, said RSSI with a desired amplitude range, and when said RSSI is not within said range, activating a hold switch between said phase detector and said loop filter-integrator, wherein said loop filter-integrator will go into a hold configuration wherein said local oscillator will remain at a constant frequency, wherein when said RSSI signal returns to an amplitude that is within said desired amplitude range, said hold switch is deactivated.

6. The method of claim 4, further comprising adjusting said phase so that when said beam is physically centered on said PSD, said distance and direction are zero.

7. The method of claim 3, further comprising producing a demodulated difference signal by inputting said amplified difference output signal into a synchronous detector and inputting said dock signal to a reference channel of said synchronous detector, wherein said demodulated difference signal comprises distance (amplitude) and direction (phase) of a position of said beam on said PSD.

8. The method of claim 7, wherein said synchronous detector is selected from the group consisting of a lock-in amplifier, a multiplier, a switching circuit, balanced modulators, and a digital signal processor.

9. The method of claim 7, further comprising filtering said demodulated difference signal with a lowpass filter to produce a filtered demodulated difference signal.

10. The method of claim 9, wherein said lowpass filter rejects said modulation frequency and its harmonics.

11. The method of claim 9, further comprising integrating, with an integrator, said filtered demodulated difference signal to produce an integrated difference signal.

12. The method of claim 11, further comprising comparing said RSSI with a desired amplitude range of said filtered demodulated difference signal, and when said RSSI is not within said range, activating a hold switch between said lowpass filter and said integrator, wherein said integrator will go into a hold configuration and remain at a constant amplitude, wherein when said RSSI signal returns to an amplitude that is within said desired amplitude range, said hold switch is deactivated.

13. The method of claim 12, further comprising amplifying said integrated difference signal to produce an amplified integrated difference signal.

14. The method of claim 7, further comprising producing an error signal by comparing said distance and said direction to a desired distance and a desired direction; and correcting said position and direction by applying said error signal to a fast steering mirror.

15. The method of claim 7, further comprising producing an error signal by comparing said distance and said direction to a desired distance and a desired direction.

16. The method of claim 15, further comprising correcting said position and direction by applying said error signal to a fast steering mirror.

17. The method of claim 1, wherein said PSD is selected from the group consisting of a lateral-effect position sensing detector and a quadrant cell.

18. The method of claim 17, wherein said lateral-effect position sensing detector is selected from the group consisting of a bilateral. PSD and a tetralateral PSD.

19. The method of claim 1, wherein a first transimpedance amplifier converts said $I_1$ to said $V_1$, and wherein a second transimpedance amplifier converts said $I_2$ to said $V_2$.

20. The method of claim 1, wherein a first operational amplifier subtracts said $V_2$ from said $V_1$ to produce said difference signal, and wherein a second operational amplifier adds said $V_1$ to said $V_2$ to produce said sum signal.

21. The method of claim 1, wherein said first bandpass filter and said second bandpass filter are each tuned to said modulation frequency.

22. The method of claim 1, wherein said first bandpass filter and said, second bandpass filter each have a bandpass bandwidth within a range from five to ten times a desired position sensing bandwidth.

23. The method of claim 1, wherein said first variable gain amplifier system and said second variable gain amplifier system each comprises a variable gain amplifier (VGA) chain.

24. The method of claim 23, wherein each said VGA chain comprises a logarithmic variable gain amplifier.

25. The method of claim 24, wherein said VGA chain comprises a first VGA stage, followed by a first interstage bandpass filter, followed by a second VGA stage, followed by a second interstage bandpass filter, followed by a third VGA stage.

26. The method of claim 1, wherein said AGC detector is selected from the group consisting of a precision rectifier and lowpass filter, an rms detector, and means for homodyne demodulation at the carrier frequency.

27. The method of claim 1, wherein said RSSI comprises a DC voltage that varies with the amplitude of said beam.

28. The method of claim 1, wherein said PSD will produce a third current ($I_3$) and a fourth current ($I_4$), wherein said $I_3$ and said $I_4$ vary ratiometrically depending on where said beam is located on said PSD, wherein said $I_1$ and said $I_2$ comprise a first detection axis and wherein said $I_3$ and said $I_4$ comprise a second detection axis, wherein said first detection axis is about orthogonal to said second detection axis.

29. The method of claim 28, further comprising:

converting said $I_3$ to a third voltage ($V_3$) and converting said $I_4$ to a fourth voltage ($V_4$); and subtracting said $V_4$ from said $V_3$ to produce a second difference signal, wherein the step of controlling, using said difference signal, said position of said beam of light on said PSD further comprises using said second difference signal for controlling said position of said beam of light on said PSD.

30. A system for controlling the position of a beam of light, comprising:

a position sensitive detector (PSD), wherein when a beam amplitude modulated (AM) light is directed onto said position sensitive detector (PSD) and said AM light is modulated at a modulation frequency, said PSD will produce a first current ($I_1$) and a second current ($I_2$), wherein said $I_1$ and said $I_2$ will vary, ratiometrically depending on where said beam is located on said PSD;

means for converting said $I_1$ to a first voltage ($V_1$);

means for converting said $I_2$ to a second voltage ($V_2$);

means for subtracting said $V_2$ from said $V_1$ to produce a difference signal;

means for digitally normalizing said difference signal to produce a normalized signal;

means for controlling, using said normalized signal, said position of said beam of light on said PSD;

means for adding said $V_1$ to said $V_2$ to produce a sum signal;

a first bandpass filter configured to filter said difference signal to produce a filtered difference signal;

a second band pass filter configured to filter said sum signal to produce a filtered sum signal;

a first variable gain amplifier system configured to amplify said filtered difference signal to produce a first amplified difference signal;

a second variable gain amplifier system configured to amplify said filtered sum signal to produce a first amplified sum signal;

an automatic gain control (AGC) detector configured to produce a detected sum signal from said first amplified sum signal, wherein said system further comprises an automatic gain control controller to produce a received signal strength indicator (RSSI) from said detected sum signal; and an electrical connection configured to feed said RSSI back to said first amplifier system to produce an amplified difference output signal that is modulated at said modulation frequency.

31. The system of claim 30, wherein said electrical connection is configured to feed said RSSI back to said second amplifier system to produce an amplified sum output signal.

32. The system of claim 31, further comprising means for producing a clock signal from said amplified sum output signal, wherein said clock signal has a frequency that corresponds to said modulation frequency.

33. The system of claim 32, wherein said means for producing a clock signal from said amplified sum output signal comprises:

a phase detector configured for detecting a phase of said amplified sum output signal;

a loop filter integrator configured for integrating an output from said phase detector; and a local oscillator configured for amplifying an output from said loop filter-integrator.

34. The system of claim 33, further comprising a hold switch connected between said phase detector and said loop filter-integrator, further comprising a comparator connected to said hold switch, wherein said comparator is configured to compare said RSSI with a desired amplitude range, and when said RSSI is not within said range, said comparator will activate said hold switch, wherein said loop filter-integrator will go into a hold configuration wherein said local oscillator will remain at a constant frequency, and wherein said comparator and hold switch are further configured that when said RSSI signal returns to an amplitude that is within said desired amplitude range, said hold switch will be deactivated.

35. The system of claim 33, further comprising a phase trim configured to adjust said phase so that when said beam is physically centered on said PSD, said distance and direction are zero.

36. The system of claim 32, further comprising a synchronous detector configured to produce a demodulated difference signal by inputting said amplified difference output signal into said synchronous detector and inputting said clock signal to a reference channel of said synchronous detector, wherein said demodulated difference signal comprises distance (amplitude) and direction (phase) of a position of said beam on said PSD.

37. The system of claim 36, wherein said synchronous detector is selected from the group consisting of a lock-in amplifier, a multiplier, a switching circuit, balanced modulators, and a digital signal processor.

38. The system of claim 36, further comprising a lowpass filter configured to filter said demodulated difference signal to produce a filtered demodulated difference signal.

39. The system of claim 38, wherein said lowpass filter rejects said modulation frequency and its harmonics.

40. The system of claim 38, further comprising an integrator configured to integrate said filtered demodulated difference signal to produce an integrated difference signal.

41. The system of claim 40, further comprising a hold switch between said lowpass filter and said integrator, said system further comprising a comparator configured to compare said RSSI with a desired amplitude range of said filtered demodulated difference signal, and when said RSSI is not within said range, said comparator will activate said hold switch, wherein said integrator will go into a hold configuration and remain at a constant amplitude, wherein said comparator and hold switch are further configured that when said RSSI signal returns to an amplitude that is within said desired amplitude range, said hold switch will be deactivated.

42. The system of claim 41, further comprising means for amplifying said integrated difference signal to produce an amplified integrated difference signal.

43. The system of claim 36, further comprising means for producing an error signal by comparing said distance and said direction to a desired distance and a desired direction, and correcting said position and direction by applying said error signal to a fast steering mirror.

44. The system of claim 36, further comprising means for producing an error signal by comparing said distance and said direction to a desired distance and a desired direction.

45. The system of claim 44, further comprising means for correcting said position and direction by applying said error signal to a fast steering mirror.

46. The system of claim 30, wherein said PSD is selected from the group consisting of a lateral-effect position sensing detector and a quadrant cell.

47. The system of claim 46, wherein said lateral-effect position sensing detector is selected from the group consisting of a bilateral PSD and a tetralateral PSD.

48. The system of claim 30, wherein said means for converting said $I_1$ to said $V_1$ comprises a first transimpedance amplifier, and wherein said means for converting said $I_2$ to said $V_2$ comprises a second transimpedance amplifier.

49. The system of claim 30, wherein said means for subtracting said $V_2$ from said $V_1$ to produce said difference signal comprises a first operational amplifier, and wherein said means for adding said $V_1$ to said $V_2$ to produce said sum signal comprises second operational amplifier.

50. The system of claim 30, wherein said first bandpass filter and said second bandpass filter are each tuned to said modulation frequency.

51. The system of claim 30, wherein said first bandpass filter and said second bandpass filter each have bandpass bandwidth within a range from five to ten times a desired position sensing bandwidth.

52. The system of claim 30, wherein said first amplifier system and said second amplifier system each comprises a variable gain amplifier (VGA) chain.

53. The system of claim 52, wherein each said VGA chain comprises a logarithmic variable gain amplifier.

54. The system of claim 53, wherein said VGA chain comprises a first amplifier stage, followed by a first interstage bandpass filter, followed by a second amplifier stage, followed by a second interstage bandpass filter, followed by a third amplifier stage.

55. The system of claim 30, wherein said AGC detector is selected from the group consisting of a precision rectifier and lowpass filter, an rms detector, and means for homodyne demodulation at the carrier frequency.

56. The system of claim 30, wherein said RSSI comprises a DC voltage that varies with the amplitude of said beam.

57. The system of claim 30, wherein said PSD will produce a third current ($I_3$) and a fourth current ($I_4$), wherein said $I_3$ and said $I_4$ vary ratiometrically depending on where said beam is located on said PSD, wherein said $I_1$ and said $I_2$ comprise a first detection axis and wherein said $I_3$ and said $I_4$ comprise a second detection axis, wherein said first detection axis is about orthogonal to said second detection axis.

58. The system of claim 57, further comprising:
   means for converting said $I_3$ to a third voltage ($V_3$) and converting said $I_4$ to a fourth voltage ($V_4$); and
   means for subtracting said $V_4$ from said $V_3$ to produce a second difference signal, wherein said means for controlling, using said difference signal, said position of said beam of light on said PSD further comprises means for using said second difference signal for controlling said position of said beam of light on said PSD.

59. A system for controlling the position of a beam of light, comprising:
   a position sensitive detector (PSD), wherein when a beam amplitude modulated (AM) light is directed onto said position sensitive detector (PSD) and said AM light is modulated at a modulation frequency, said PSD will produce a first current ($I_1$) and a second current ($I_2$), wherein said $I_1$ and said $I_2$ will vary ratiometrically depending on where said beam is located on said PSD;
   means for converting said h to a first voltage ($V_1$);
   means for converting said $I_2$ to a second voltage ($V_2$);
   means for subtracting said $V_2$ from said $V_1$ to produce a difference signal;
   means for controlling, using said difference signal, said position of said beam of light on said PSD;
   means for adding said $V_1$ to said $V_2$ to produce a sum signal;
   a first band pass filter configured to filter said difference signal to produce a filtered difference signal;
   a second bandpass filter configured to filter said sum signal to produce a filtered sum signal;
   a first variable gain amplifier system configured to amplify said filtered difference signal to produce a first amplified difference signal;
   a second variable gain amplifier system configured to amplify said filtered sum signal to produce a first amplified sum signal;
   an automatic gain control (AGC) detector configured to produce a detected sum signal from said first amplified sum signal;
   an automatic gain control controller configured to produce a received signal strength indicator (RSSI) from said detected sum signal;
   an electrical connection configured to feed said RSSI back to said first amplifier system to produce an amplified difference output signal that is modulated at said modulation frequency, wherein said electrical connection is configured to feed said RSSI back to said second amplifier system to produce an amplified sum output signal;
   means for producing a clock signal from said amplified sum output signal, wherein said clock signal has a frequency that corresponds to said modulation frequency; and
   a synchronous detector configured to produce a demodulated difference signal by inputting said amplified difference output signal into said synchronous detector and inputting said clock signal to a reference channel of said synchronous detector, wherein said demodulated difference signal comprises distance (amplitude) and direction (phase) of a position of said beam on said PSD.

60. A method for controlling the position of a beam of light, comprising:
   directing a beam of amplitude modulated (AM) light onto a position sensitive detector (PSD), wherein said AM light is modulated at a modulation frequency, wherein said PSD will produce a first current ($I_1$) and a second current ($I_2$), wherein said $I_1$ and said $I_2$ vary ratiometrically depending on where said beam is located on said PSD;
   converting said $I_1$ to a first voltage ($V_1$) and converting said $I_2$ to a second voltage ($V_2$);
   subtracting said $V_2$ from said $V_1$ to produce a difference signal;
   adding said $V_1$ to said $V_2$ to produce a sum signal;
   filtering said difference signal with a first bandpass filter to produce a filtered difference signal;
   filtering said sum signal with a second bandpass filter to produce a filtered sum signal;
   amplifying said filtered difference signal with a first variable-gain amplifier system to produce a first amplified difference signal;
   amplifying said filtered sum signal to a second variable-gain amplifier system to produce a first amplified sum signal;
   detecting a sum signal from said first amplified sum signal to produce a detected sum signal;
   producing a received signal strength, indicator (RSSI) from said detected sum signal;
   feeding said RSSI back to said first amplifier system to produce an amplified difference output signal that is modulated at said modulation frequency;
   feeding said RSSI back to said second amplifier system to produce an amplified sum output signal;
   producing a clock signal from said amplified sum output signal, wherein said clock signal has a frequency that corresponds to said modulation frequency;
   producing a demodulated difference signal by inputting said amplified difference output signal into a synchronous detector and inputting said clock signal to a reference channel of said synchronous detector, wherein said demodulated difference signal comprises distance (amplitude) and direction (phase) of a position of said beam on said PSD.

* * * * *